No. 636,658. Patented Nov. 7, 1899.
T. GRACE.
DRIVING MECHANISM FOR VELOCIPEDES.
(Application filed June 9, 1897.)
(No Model.)

Witnesses,
Vinton Coombs
Robert Everett

Inventor:
Thomas Grace,
By James L. Norris
Atty.

THE NORRIS PETERS CO., PHOTO-LITHO., WASHINGTON, D. C.

UNITED STATES PATENT OFFICE.

THOMAS GRACE, OF DARLINGTON, NEW SOUTH WALES.

DRIVING MECHANISM FOR VELOCIPEDES.

SPECIFICATION forming part of Letters Patent No. 636,658, dated November 7, 1899.

Application filed June 9, 1897. Serial No. 640,086. (No model.)

*To all whom it may concern:*

Be it known that I, THOMAS GRACE, builder, a subject of the Queen of Great Britain, residing at Darlington, near Sydney, in the British Colony of New South Wales, have invented new and useful Improvements in Driving Mechanism for Velocipedes, of which the following is a specification.

The invention relates to bicycles and other velocipedes, and has for its object to provide novel, simple, and efficient means for rotating the sprocket or other wheel by which the driving power is transmitted to the rear driving-wheel of the vehicle.

These improvements in driving mechanism of velocipedes consist in the combination and arrangement, with the axle, of the driving-gear or driving-axle of a duplicate set of two-linked levers having their fulcrums on or attached to the frame of the velocipede, so that one of said levers will receive the impulse from the foot of the operator and the other of said levers will impart the motion to a crank upon the axle of the driving-gear. The first or foot lever is a lever of the first class conveniently fulcrumed above the driving-axle, while the second or crank lever is a lever of the second class conveniently fulcrumed behind the driving-axle, and it has a connecting rod or link from midway or thereabout of its length to a crank-pin on the sprocket-wheel or on a disk on the driving-axle. Between the two levers the connecting rod or link is preferably adjustable in length, so as to provide suitable margin for "lead" in the passing of the crank-pin over its dead-center. At each end of this rod or link is a nosing or stop against any excessive movement of either lever. The two levers and the connecting rods and links described are in duplicate, one set on either side of the machine, and the crank-pins or the crank-disks are on either end of the driving or pedal axle and would preferably have the cranks either diametrically opposite or set at some very obtuse angle.

In applying this driving mechanism to an ordinary bicycle an angle-piece is formed integral with or is clamped to the diagonal and the forward stay of the frame in the angle at which these two meet, and this angle-piece carries pivots or fulcrums of the pair of the foot-levers. The fulcrum-pins or the pivot of the crank or second-class levers I forge on or clamp to the lower back fork.

In order that this invention may be clearly understood, reference will now be made to the drawings herewith, in which—

Figure 1:
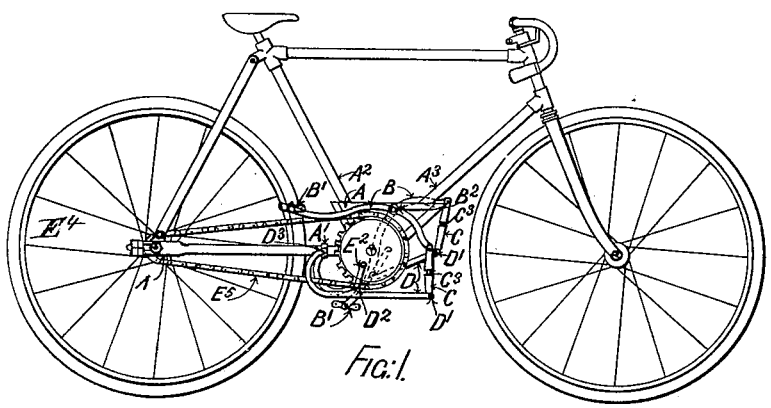
Figure 2:
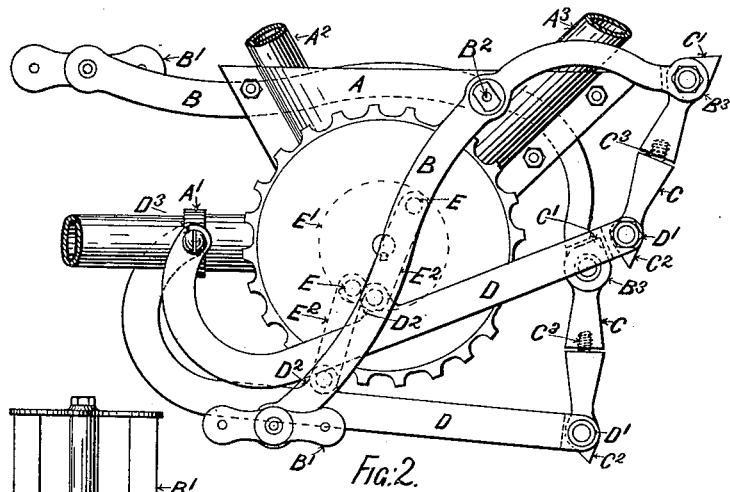
Figure 3:
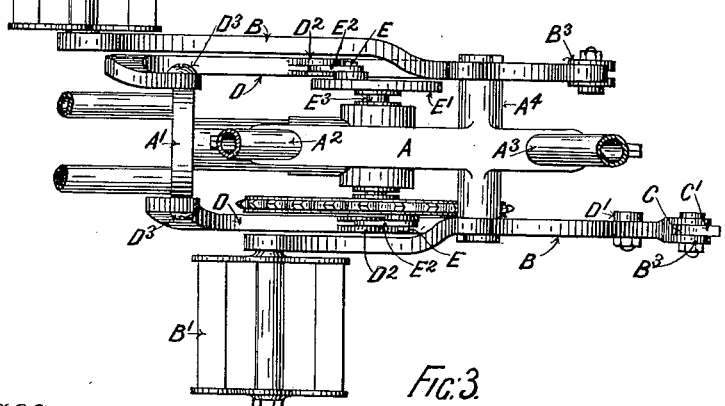

Figure 1 is a side elevation of a bicycle having these present improvements affixed thereto. Fig. 2 is a side elevation, on an enlarged scale, of these improvements in position, and Fig. 3 is a plan of Fig. 2.

In order to enable those skilled in the art to make and use my invention, I will now describe the same in detail, referring to the drawings, wherein—

The letters $A^2$ and $A^3$ indicate parts of the frame of a cycle, at the junction of which is clamped or otherwise rigidly secured a triangular bracket A, formed integral or otherwise provided at its opposite sides with lateral tubular hubs $A^4$, containing a transverse pivot-pin $B^2$. A first-class or foot lever B is mounted between its ends on the pivot-pins and at its rear end carries a pivoted pedal B'. The other end $B^3$ is knuckle-jointed to the connecting-rod C. The connecting-rod C is split or divided and has screw junction and adjustment $C^3$, so that its length may be varied, and its lower end is knuckle-jointed at D' to the lever of the second-class or "crank" lever (marked D.) It also has nosings or stops C' and $C^2$, which are adapted to take against the ends of the jaws of the levers B and D, respectively, to prevent excessive movement or the displacement of either lever from its proper working position. The crank-lever D is fulcrumed at $D^3$ to bracket-piece A', forming junction of back lower fork, though the pivots $D^3$ might be the ends of a pin passed through and held in the prongs of the back lower fork or be the ends of a clamp taking over the prongs or over the tang of said back fork. From a knuckle-joint $D^2$, about midway of the length of the lever D or at such point as the ratio of the speed or power requires, a connecting rod or link $E^2$ extends to crank-pin E on a sprocket or other wheel E', carried by a transverse shaft $E^3$, and by which the driving-power is transmitted to the axle of the rear driving-wheel $E^4$ through the medium of a chain $E^5$ or otherwise.

There is a wheel E', crank-lever D, link $E^2$, connecting-rod C, and foot-lever B at each side of the angle-bracket A on the bicycle-frame; but obviously only one of the wheels E' requires to be a sprocket or similar wheel to gear with the rear driving-wheel.

In operation the motion of the foot and leg of the rider, (mounted upon the saddle of the velocipede as ordinarily,) pressing upon the pedal B', depresses the lever B on its fulcrum $B^2$, causing the end $B^3$, by means of the connecting-rod C, to lift or pull the lever D upwardly on its fulcrum $D^3$. As one lever B is thus depressed the other lever B on the other side of the machine is rising, the weight and pressure of the foot being relieved the connecting rod or link $E^2$ from crank-pin E causing the upward movement. The alternate upward and downward motion of the lever B and crank E by means of the connecting-rod $E^2$ causes the disk E' and the sprocket-wheel to revolve the axle of the driving-gear, and thus by the chain-gear, as well understood, or equivalent substitutes actuating the driving or rear wheel of the bicycle.

It is to be understood, though the best-known manner of combining these present improvements with an ordinary pattern of "safety-bicycle" has been illustrated and described, that these said improvements are not confined to the precise detail of construction so long as the nature of this invention be retained.

Having now particularly described and ascertained the nature of my said invention and in what manner the same is to be performed, I declare that what I claim is—

1. The combination with the frame, and the rear driving-wheel of a cycle, of a transverse shaft having wheels on its ends provided with crank-pins and one geared to the driving-wheel, a bracket-piece secured to the cycle-frame in rear of said shaft, crank-levers pivoted at their rear ends to opposite sides of said bracket-piece, links connecting the crank-levers centrally between their ends with said crank-pins, foot-levers pivotally mounted between their ends on a part of the cycle-frame above said shaft and provided at their rear ends with pedals, and rods connecting the front ends of said foot-levers with the front ends of said crank-levers, substantially as described.

2. The combination with the frame, and the rear driving-wheel of a cycle, of a transverse shaft having wheels at its ends provided with crank-pins and one geared with the driving-wheel, a bracket-piece secured to the cycle-frame in rear of said shaft, crank-levers pivoted at their rear ends to opposite sides of said bracket-piece, links connecting the crank-levers centrally with said crank-pins, an angle-bracket mounted on the cycle-frame and having lateral hubs provided with a pivot, foot-levers mounted intermediate their ends on said pivot at opposite sides of the angle-bracket, and provided at their rear ends with pedals, and rods connecting the front ends of the foot-levers with the front ends of the crank-levers, substantially as described.

Dated this 30th day of April, 1897.

THOMAS GRACE.

Witnesses:
FRED WALSH,
PERCY NEWELL.